United States Patent Office 3,531,421
Patented Sept. 29, 1970

3,531,421
CERAMIC COMPONENT FOR ELECTRODES
Marc Foex, Montlouis, Anne-Marie Anthony, Meudon, and David Yerouchalmi, Le Mesnil-Saint-Denis, France, assignors to Commissariat a l'Energie Atomique, Paris, France
No Drawing. Filed Jan. 30, 1968, Ser. No. 701,552
Claims priority, application France, Feb. 8, 1967, 94,180
Int. Cl. H01b 1/06; G21d 7/02
U.S. Cl. 252—520                                8 Claims

ABSTRACT OF THE DISCLOSURE

A ceramic component for electrodes, said component being essentially constituted at least by a solid solution of two mixed oxides having a perovskite structure and corresponding to the formula $ABC_3$ wherein A is an alkaline-earth metal or a rare-earth metal and B is a different metal from A. One of these mixed oxides is a rare-earth chromite having the general formula $RCrO_3$ wherein R designates a metal which forms part of the rare-earth group.

---

This invention relates to ceramic components which are intended to be employed in the fabrication of high-temperature electrodes and especially electrodes of the type employed in magnetohydrodynamic (MHD) converters.

More specifically, the invention is concerned with ceramic components for electrodes in which at least a part contains a rare-earth chromite having the formula $RCrO_3$ wherein R designates the rare-earth element.

The such components have a number of advantages over those which were previously employed, especially insofar as they are capable of retaining relatively high conductivity at temperatures well below their melting point. However, it is known that, during operation, MHD electrodes have one face which is heated to a very high temperature (namely the face which is in contact with the hot ionized gases) and on the opposite side, a face which is at a lower temperature and which is usually cooled by circulation of a coolant.

However, components made of chromite suffer from a disadvantage which is troublesome in some cases. Under the operating conditions which are usually encountered in MHD power generation, the rare-earth chromites exhibit a fairly high vaporization rate and, in particular, a preferential release of chromium oxide. This property often limits operating temperatures to a relatively low value or, if the operation is carried out at higher temperatures, results in short electrode lives which are incompatible with their use in a MHD power generating plant which is designed to operate over a period of 10,000 hours.

The present invention is primarily intended to circumvent or to remove this disadvantage and to provide components for electrodes which, are fabricated from a product having a low vaporization rate, at least in that portion thereof which is heated to very high temperatures while retaining good conductivity in the vicinity of the cooled face.

To this end, the invention proposes a ceramic component for electrodes, said component being essentially constituted at least partially by a solid solution of two mixed oxides having a perovskite structure and corresponding to the formula $ABO_3$, wherein A is an alkaline-earth metal or a rare-earth metal and B is a metal different from A, one of the mixed oxides being a rare-earth chromite having the general formula $RCrO_3$, wherein R designates a metal which forms part of the rare earth group.

The mixed oxides which are added to the rare-earth chromite for the purpose of reducing the volatility are nonconductive refractory compounds having a structure which is similar to that of the chromites $RCrO_3$; they are capable of dissolving in the solid state large quantities of rare-earth chromites. The presence of the chromites endows the component thus formed with high electrical conductivity under operating conditions and the chromium oxide which is inserted in the components in dilute form and fixed by some of the compounds vaporizes to a much lesser degree than from pure chromite.

By way of examples of mixed oxides which are employed in accordance with the invention in solid solution with the rare-earth chromites, and especially lanthanum chromite, mention can be made of the alkaline-earth zirconates and the rare-earth aluminates. In a more general manner, it is possible in particular to contemplate the use of the following compounds in association with the rare-earth chromites (this list is not intended to be limitative):

(a) The rare-earth aluminates $RAlO_3$ (in particular the lanthanum aluminate $LaAlO_3$ which is the most refractory compound of the series and the melting point of which is approximately 2100° C.).

(b) The alkaline-earth zirconates $AZrO_3$ such as $CaZrO_3$, $SrZrO_3$ and $BaZrO_3$. In this group, the strontium zirconate $SrZrO_3$ is of special interest since its melting point in the pure state attains or even exceeds 2750° C. and it dissolves in the solid state high proportions of lanthanum chromite without giving rise to any appreciable appearance of other phases.

(c) The alkaline-earth hafniates $AHfO_3$.
(d) The alkaline-earth titanates $ATiO_3$.
(e) The alkaline-earth stannates $ASnO_3$.
(f) Various compounds formed by cerium dioxides and the alkaline-earth oxides.

It is evidently possible and sometimes preferable either to associate a number of the above-mentioned compounds in the material which constitutes the component or to use the compounds which are added to the rare-earth chromite not in their stoichiometric form. For example, if strontium zirconate is employed (this is one of the most refractory of the compounds which are suitable), provision can accordingly be made for an excess quantity of zirconia with respect to the strontium oxide or conversely.

The products constituted by the solid solutions defined above have much lower electrical conductivity in the cold state than pure lanthanum chromite, but their conductivity increases rapidly with the temperature and high values have in fact been observed at high temperatures. At equal temperature, the effects of vaporization are much smaller than in the case of pure lanthanum chromite, not only by virtue of the dilution of this latter, but also as a result of braking of the volatilization process and of the release of chromium oxide which is brought about by addition of the compound.

By way of examples of products for electrodes in accordance with the invention, there can be mentioned the saturated solid solution which consists of strontium zirconate $SrZrO_3$ and lanthanum chromite $LaCrO_3$: in the solid solution, strontium zirconate $SrZrO_3$ is present in a high proportion and reduces to a low value the volatility of the chromium oxide.

A comparative test of evaporation rates carried out at 2300° C. in at atmosphere composed of one-half argon and one-half air has shown that the lanthanum chromite $LaCrO_3$ was 14 times more volatile than the solid solution produced from the mixture comprising 90 molecules of strontium zirconate ($SrZrO_3$) for 10 molecules of lanthanum chromite ($LaCrO_3$). The major part of the volatalized product was chromium oxide. By way of comparison, it should be noted in addition that, under the same conditions, $CrO_3$ is 12 times more volatile than $LaCrO_3$.

Similar results have been obtained with ceramic components having the following composition:

(a) 50 mole percent $LaCrO_3$ in respect of 50 mole percent $SrZrO_3$,
(b) 20 mole percent $LaCrO_3$ in respect of 80 mole percent $SrZrO_3$, or
(c) 33 mole percent $LaCrO_3$ in respect of 66 mole percent $SrZrO_3$.

The characteristics of conductivity of an equimolecular mixture of lanthanum chromite and strontium zirconate are indicated hereinafter and compared with those of lanthanum chromite alone and strontium zirconate alone.

|  | $LaCrO^3$ | $SrZrO^3$ | Mixture |
|---|---|---|---|
| Electrical conductivity, mhos/m.: |  |  |  |
| At 1,000° K | 60 | 0.005 | 1 |
| At 1,500° K | 80 | 0.2 | 8 |
| Proportion of ionic conduction at 1,200° K., percent | <1 | 50 | <1 |

It is observed that, in spite of the presence of 50 mole percent of strontium zirconate, the mixture retains the electronic type of conductivity of the lanthanum chromite as is necessary in order to avoid the processes of electrolysis in a direct-current MHD converter.

Moreover, by virtue of the lanthanum chromite, the mixture is conductive even at low temperature, which is not the case with strontium zirconate.

The ceramic components according to the invention can therefore be employed to advantage in the fabrication of MHD converter electrodes in which the electrode face which is in contact with the ionized gases remains at very high temperature whilst the opposite face is cooled to a lower temperature.

Since the properties of ceramics vary with the temperature, it frequently proves an advantage to form the MHD electrodes from several layers of different composition which are intimately bonded to each other.

However, it is necessary in that case to ensure that the superposed layers are not liable to give rise at high temperature to the formation of eutectics with a melting point considerably lower than that of the initial materials. Similarly, any mutual contamination of successive layers which would modify their properties to an appreciable extent must accordingly be prevented. These essential requirements are complied with in the ceramic components according to the invention by forming the different layers from a solid solution of two mixed oxides having a perovskite structure and varying in composition from one layer to the next.

The oxides which are employed in this case and which all belong to the same crystal family are capable of producing solid solutions with each other over wide ranges, thereby preventing the formation of troublesome eutectics.

A slight diffusion can take place without thereby affecting the refractory character of the ceramic material to too great an extent; in addition, these diffusion effects remain limited during long-term processes.

By way of example, a ceramic product in accordance with the invention which constitutes a MHD converter electrode comprises a number of intimately bonded layers formed of a solid solution of lanthanum chromite with a mixed oxide of the perovskite type $ABO_3$ and containing a proportion of rare-earth chromite which increases with the distance from the very high temperature electrode-face to the cold electrode-face until said layers finally consist of pure rare-earth chromite at said cold face.

The good conductivity of lanthanum chromite at the temperature of the cold face is thus turned to profitable account and volatilization of the chromium oxide is then negligible.

It is also possible to avoid the use of the rare-earth chromites in the hottest zones by forming these latter from solid solutions of mixed oxides which have a mixture of the perovskite type and are conductive in the hot state. Thus, the layers located in the vicinity of the electrode face which is heated to a very high temperature are advantageously constituted:

(a) By a solid solution of an alkaline-earth zirconate and especially strontium zirconate with a rare-earth aluminate such as $LaAlO_3$, or
(b) By a solid solution of alkaline-earth zirconate and especially strontium and a mixed oxide of two different elements of the rare earth group (such as, for example, lanthanum oxide $La_2O_3$ and ytterbium oxide $Yb_2O_3$).

The components in accordance with the invention can be prepared by means of any known process. In particular, the constituents can be melted together in the desired proportions, the blocks obtained can be crushed after cooling, the parts being subjected to a sintering process by baking to a suitable temperature either after forming by compacting or while being maintained in the compacted state. In order to provide a binding agent for the products mentioned above, it is also possible to contemplate the use of the divided product obtained by rapid evaporation of a mixture of soluble salts (nitrates, for example, in suitable proportions).

In order to bond a number of layers having different compositions, the following method can advantageously be adopted: pastilles containing different proportions of lanthanum chromite are graded in the order of increasing content of $LaCrO_3$ so that two adjacent pastilles thus have relatively close compositions. The assembly of pastilles thus graded and stacked is subjected to compression, followed by heating to a sufficient temperature to form a well bonded block. If the pastilles have already been baked separately, it is possible to introduce between two adjacent pastilles a small quantity of raw product having a composition comprised between those of said pastilles prior to carrying out either a compacting process followed by baking or a process of baking under pressure.

The ceramic components for electrodes according to the invention retain good characteristics at high temperature, namely excellent electrical conductivity, low thermal conductivity which is considerably lower than that of metals and metal alloys (with the result that the frontal electrode face which is in contact with the hot gases can be maintained at high temperature), the absence of any allotropic transformations which, as a result of abrupt changes in volume, would otherwise be liable to cause fracture of the components and, finally, conductivity of an electronic type.

What we claim is:

1. A ceramic component for electrodes, said component being essentially constituted at least partially by a solid solution of two mixed oxides having a perovskite structure and corresponding to the formula $ABO_3$ wherein A is an alkaline-earth metal or a rare-earth metal and B is a different metal from A, one of the mixed oxides being a rare-earth chromite having the general formula $RCrO_3$ wherein R desinates a metal which forms part of the rare earth group.

2. A ceramic component in accordance with claim 1, wherein the other mixed oxide aforesaid is selected from the group consisting of the rare-earth aluminates, the alkaline-earth zirconates, the alkaline-earth hafniates, the alkaline-earth stannates and the various compounds formed by cerium dioxide and the alkaline-earth oxides.

3. A ceramic component in accordance with claim 1, wherein the other mixed oxide aforesaid is strontium zirconate $SrZrO_3$.

4. A ceramic component in accordance with claim 1, wherein said solid solution contains between 10 and 60 mole percent of rare-earth chromites.

5. A ceramic component in accordance with claim 1 which constitutes an electrode for a magnetohydrodynamic converter and comprises a plurality of intimately bonded layers each formed of a solid solution of two mixed oxides having a perovskite structure and a composition which is variable from one layer to the next.

6. A ceramic component in accordance with claim 5, wherein at least some of said layers contain a proportion of rare-earth chromites which increases with the distance from the very high temperature electrode-face to the cold electrode-face until said layers finally consist of pure chromite at said cold face.

7. A ceramic component in accordance with claim 5 wherein the layers located in the vicinity of the very high temperature electrode-face are constituted by a solid solution of an alkaline-earth zirconate, especially strontium, and a rare-earth aluminate.

8. A ceramic component in accordance with claim 5, wherein the layers located in the vicinity of the very high temperature electrode-face are constituted by a solid solution of alkaline-earth zirconate, especially strontium, and a mixed oxide of two different elements of the rare-earth group.

References Cited

UNITED STATES PATENTS 3,441,517  4/1969  Brauer et al. _____ 252—520

FOREIGN PATENTS 1,462,400  11/1966  France.

DOUGLAS J. DRUMMOND, Primary Examiner

U.S. Cl. X.R.

106—39; 252—521; 310—11